(12) United States Patent
Inagaki et al.

(10) Patent No.: US 11,427,206 B2
(45) Date of Patent: Aug. 30, 2022

(54) VEHICLE OPERATION ASSISTANCE DEVICE, VEHICLE OPERATION ASSISTANCE METHOD, AND PROGRAM

(71) Applicant: NEC CORPORATION, Tokyo (JP)

(72) Inventors: Kazuki Inagaki, Tokyo (JP); Hideki Amemiya, Tokyo (JP); Norimasa Tamura, Tokyo (JP); Kazuki Ogata, Tokyo (JP)

(73) Assignee: NEC CORPORATION, Tokyo (JP)

( * ) Notice: Subject to any disclaimer, the term of this patent is extended or adjusted under 35 U.S.C. 154(b) by 150 days.

(21) Appl. No.: 16/623,892

(22) PCT Filed: Mar. 15, 2018

(86) PCT No.: PCT/JP2018/010248
§ 371 (c)(1),
(2) Date: Dec. 18, 2019

(87) PCT Pub. No.: WO2018/235356
PCT Pub. Date: Dec. 27, 2018

(65) Prior Publication Data
US 2021/0146934 A1    May 20, 2021

(30) Foreign Application Priority Data
Jun. 21, 2017    (JP) .............................. JP2017-121643

(51) Int. Cl.
*B60W 40/09*    (2012.01)
*G06V 20/59*    (2022.01)

(52) U.S. Cl.
CPC ........... *B60W 40/09* (2013.01); *G06V 20/597* (2022.01); *B60W 2540/225* (2020.02); *B60W 2540/229* (2020.02)

(58) Field of Classification Search
CPC ........... B60W 40/09; B60W 2540/225; B60W 2540/229; G06K 9/00845; G06V 20/597
See application file for complete search history.

(56) References Cited

U.S. PATENT DOCUMENTS 9,975,483 B1 *    5/2018    Ramaswamy ........ B60W 40/08
2009/0022368 A1    1/2009    Matsuoka et al.
(Continued)

FOREIGN PATENT DOCUMENTS

GB        2532457 A       5/2016
JP        7-280592 A      10/1995
(Continued)

OTHER PUBLICATIONS

Communication dated Dec. 8, 2020, issued by the Japanese Patent Office in application No. 2017-121643.
(Continued)

*Primary Examiner* — Mohamed Barakat

(57) ABSTRACT

A vehicle operation assistance device is provided with: a visual line range determination unit that determines whether a recognition range including a visual line range of an operator of a mobile body corresponds to either an operation panel range to be operated or an external-environment checking range; a vigilance calculation unit that calculates alertness and attentiveness of the operator on the basis of at least movement of the operator's visual line; and a control unit that controls on-board devices of the mobile body on the basis of the recognition range and at least one of the alertness and attentiveness.

9 Claims, 4 Drawing Sheets

(56) References Cited

U.S. PATENT DOCUMENTS

| | | | |
|---|---|---|---|
| 2015/0254517 A1* | 9/2015 | Hoshiya | H04N 5/2355 348/119 |
| 2016/0328973 A1* | 11/2016 | Katayama | B60R 1/00 |
| 2017/0021837 A1* | 1/2017 | Ebina | B60K 28/06 |

FOREIGN PATENT DOCUMENTS

| | | | |
|---|---|---|---|
| JP | 7-329657 A | | 12/1995 |
| JP | 2009-018625 A | | 1/2009 |
| JP | 2009018625 A | * | 1/2009 |
| JP | 2012-104070 A | | 5/2012 |
| JP | 2012104070 A | * | 5/2012 |
| WO | 2007/105792 A1 | | 9/2007 |

OTHER PUBLICATIONS

International Search Report of PCT/JP2018/010248 dated May 1, 2018 [PCT/ISA/210].

* cited by examiner

VEHICLE OPERATION ASSISTANCE DEVICE, VEHICLE OPERATION ASSISTANCE METHOD, AND PROGRAM

CROSS REFERENCE TO RELATED APPLICATIONS

This application is a National Stage of International Application No. PCT/JP2018/010248, filed Mar. 15, 2018, claiming priority to Japanese Patent Application No. 2017-121643, filed Jun. 21, 2017, the contents of all of which are incorporated herein by reference in their entirety.

TECHNICAL FIELD

The present invention relates to a vehicle operation assistance device, a vehicle operation assistance method, and a program thereof.

BACKGROUND ART

Patent Document 1 discloses a technique for determining the action or state of a driver (operator) driving a vehicle by using the face orientation or visual line direction of the driver.

CITATION LIST

Patent Literature

[Patent Document 1] WO 2007/105792

SUMMARY OF INVENTION

Problems to be Solved by the Invention

Although each function of an on-board device installed in a mobile body such as a vehicle is improved with techniques such as that disclosed in Patent Document 1, a technique is desired that can further assist operation of a mobile body by an operator in addition to improving each function of the on-board device.

Therefore, the present invention has as its object to provide a vehicle operation assistance device, a vehicle operation assistance method, and a program thereof that solve the aforementioned issue.

Means for Solving the Problems

According to a first aspect of the present invention, a vehicle operation assistance device includes: a visual line range determination unit that determines whether a recognition range including a visual line range of an operator of a mobile body corresponds to either an operation panel range to be operated or an external-environment checking range; a vigilance calculation unit that calculates alertness and attentiveness of the operator on the basis of at least movement of the operator's visual line; and a control unit that controls on-board devices of the mobile body on the basis of the recognition range and at least one of the alertness and attentiveness.

According to a second aspect of the present invention, a vehicle operation assistance method including determining whether a recognition range including a visual line range of an operator of a mobile body corresponds to either an operation panel range to be operated or an external-environment checking range; calculating alertness and attentiveness of the operator on the basis of at least movement of the operator's visual line; and controlling on-board devices of the mobile body on the basis of the recognition range and at least one of the alertness and attentiveness.

According to a third aspect of the present invention, a program causes a computer of a vehicle operation assistance device to execute processes of determining whether a recognition range including a visual line range of an operator of a mobile body corresponds to either an operation panel range to be operated or an external-environment checking range; calculating alertness and attentiveness of the operator on the basis of at least movement of the operator's visual line; and controlling on-board devices of the mobile body on the basis of the recognition range and at least one of the alertness and attentiveness.

Advantageous Effects of Invention

According to the present invention, it is possible to more highly assist operation of a mobile body by an operator.

DESCRIPTION OF EMBODIMENTS

Hereinbelow, the vehicle operation assistance device according to one embodiment will be described with reference to the drawings.

Figure 1:
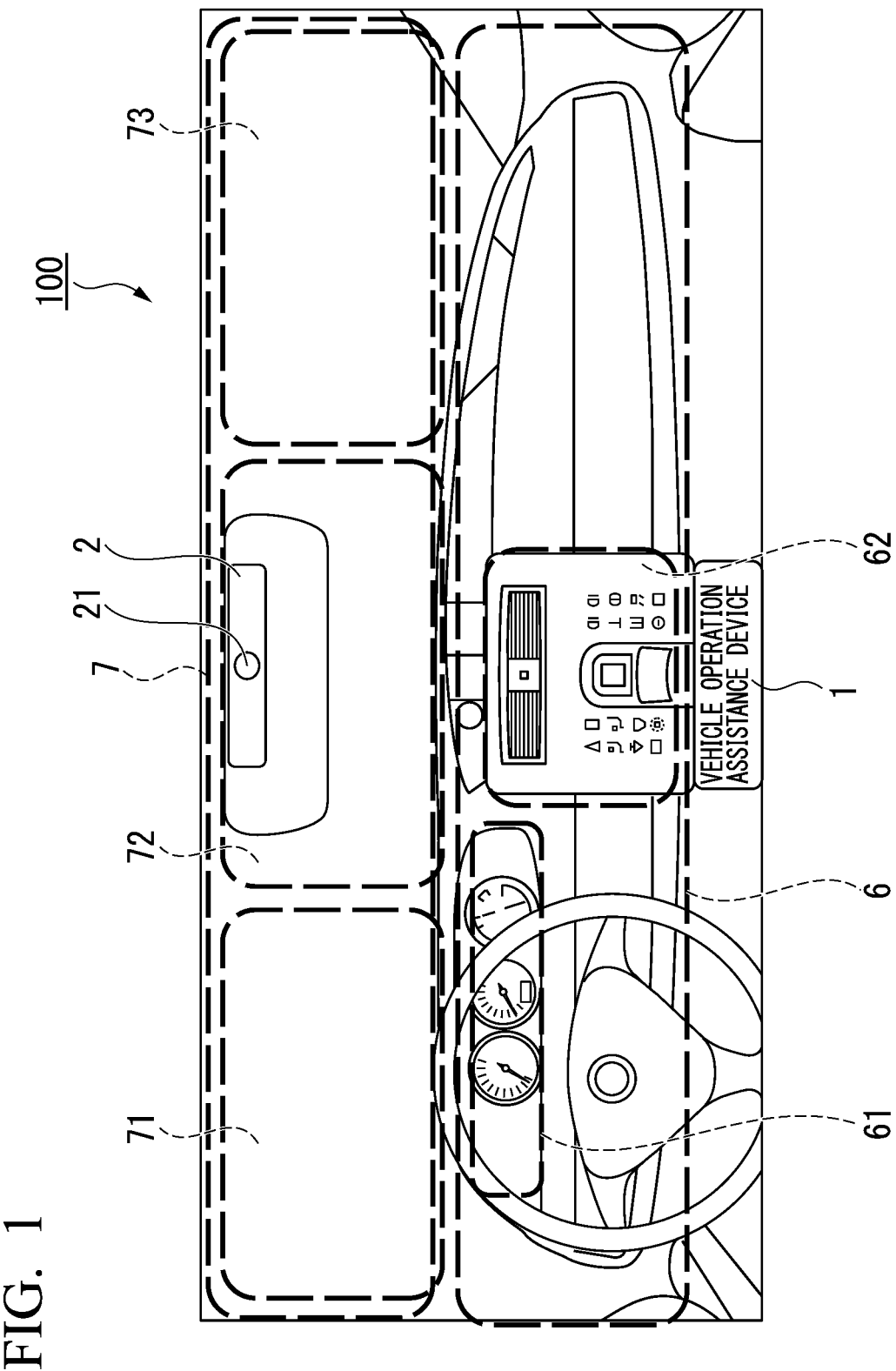
FIG. 1 is a schematic drawing of a vehicle operation assistance system provided with the vehicle operation assistance device.

FIG. 1 is a schematic drawing of a vehicle operation assistance system 100 provided with a vehicle operation assistance device 1 according to the embodiment.

The vehicle operation assistance system 100 is for example provided in a vehicle. In the vehicle operation assistance system 100, at least the vehicle operation assistance device 1 and a monitoring device 2 are connected by a communication cable. The vehicle operation assistance device 1 performs processing for assisting operation by the operator. The monitoring device 2 is provided with a camera 21. The monitoring device 2 uses the camera 21 to capture images of the operator's face.

The vehicle operation assistance device 1 acquires a facial image of the operator from the monitoring device 2. The vehicle operation assistance device 1 specifies the gaze position on the basis of the operator's face orientation and visual line direction that appear in the facial image. Using the specified gaze position, the vehicle operation assistance device 1 determines whether the recognition range including the operator's visual line range is either an operation panel range 6 to be operated or an external-environment checking range 7. The vehicle operation assistance device 1 performs control of an on-board device installed in the vehicle on the basis of the recognition range and at least one of the operator's alertness and attentiveness.

The on-board device is, for example, a driving auxiliary device such as various instruments provided in the operation panel range, a display device, a brake device, an acceleration control device, an audio device, or the like.

The operation panel range 6 is a range in which operation elements for the operator to operate the vehicle are provided. A plurality of areas such as an indicator area 61 and an audio operation area 62 are set in the operation panel range 6. The vehicle operation assistance device 1 stores coordinates representing the operation panel range 6, the indicator area 61, and the audio operation area 62 when virtual space coordinates corresponding to the vehicle interior are converted into plane coordinates.

The external-environment checking range 7 is a range for the operator to check the external environment of the vehicle. In the present embodiment, the range of window glass such as the windshield, side windows, and rear window is the external-environment checking range 7. A plurality of areas such as a first area 71, a second area 72, and a third area 73 are set in the external-environment checking range 7. The vehicle operation assistance device 1 stores coordinates representing the first area 71, the second area 72, and the third area 73 when the virtual space coordinates corresponding to the interior of the vehicle are converted into plane coordinates.

FIG. 1 shows a state in which the external-environment checking range 7 corresponds to the area of the entire windshield. The external-environment checking range 7 may include ranges that the operator views when checking the external environment of the vehicle, such as a left and right door glass and the back glass. Also, the range of a monitor that displays images of the external environment of the vehicle captured by a camera, provided in the vehicle, that captures images of the external environment may be defined as the external-environment checking range 7.

Figure 2:
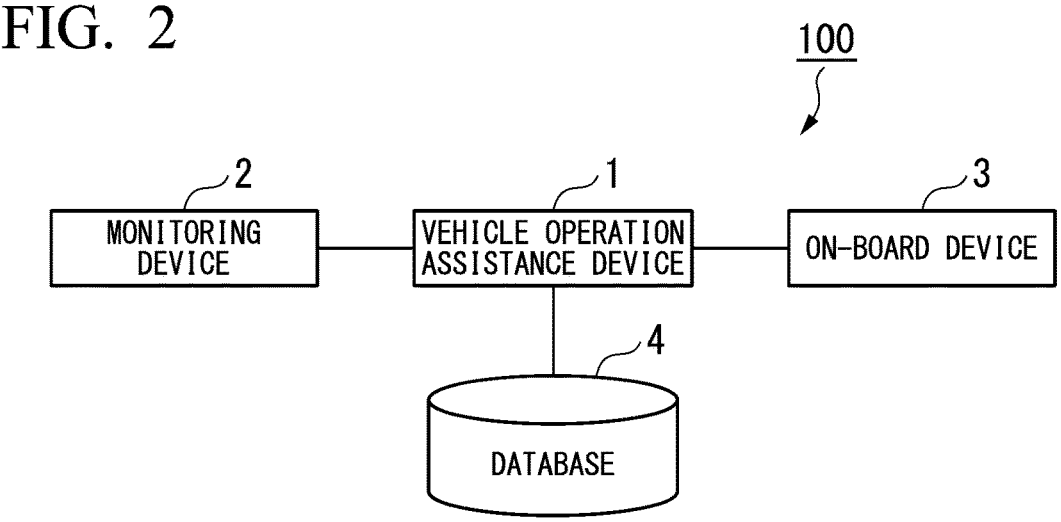
FIG. 2 is a block drawing of a device that constitutes the vehicle operation assistance system.

FIG. 2 is a block diagram of a device constituting the vehicle operation assistance system.

As shown in FIG. 2, in the vehicle operation assistance system 100, the vehicle operation assistance device 1 and the monitoring device 2 are connected for communication, and the vehicle operation assistance device 1 is connected for communication with an on-board device 3 and a database 4. Connection for communication is realized by an in-vehicle LAN or the like.

Figure 3:
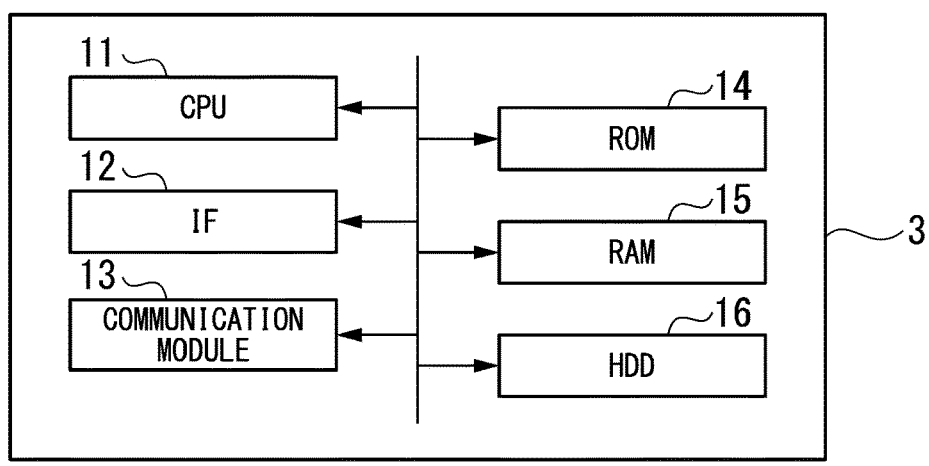
FIG. 3 is a drawing that shows the hardware configuration of the vehicle operation assistance device.

FIG. 3 is a drawing that shows the hardware configuration of the vehicle operation assistance device.

As shown in FIG. 3, the vehicle operation assistance device 1 is a computer provided with constituent elements such as a CPU (Central Processing Unit) 11, an IF (Interface) 12, a communication module 13, a ROM (Read Only Memory) 14, a RAM (Random Access Memory) 15, an HDD (Hard Disk Drive) 16 and the like. The communication module 13 is hardware for controlling the communication connections with other devices. The communication module 13 may perform wireless communication with another device, may perform wired communication, and may have both these two functions.

Note that the monitoring device 2 and the on-board device 3 other than the vehicle operation assistance device 1 may have the same hardware configuration.

Figure 4:
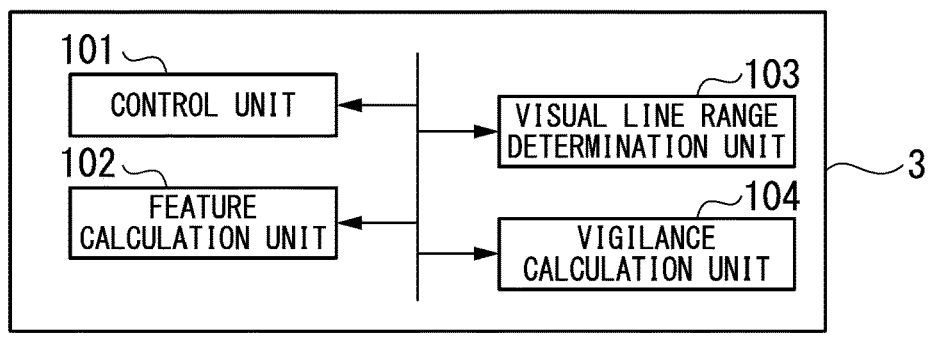
FIG. 4 is a function block drawing of the vehicle operation assistance device.

FIG. 4 is a function block diagram of the vehicle operation assistance device.

The CPU 11 of the vehicle operation assistance device 1 is provided with a control unit 101, a feature calculation unit 102, a visual line range determination unit 103, and a vigilance calculation unit 104 by executing a vehicle operation assistance program that has been stored.

The control unit 101 controls other function units provided in the vehicle operation assistance device 1 and the on-board device 3.

The feature calculation unit 102 calculates the vehicle operator's face orientation vector, visual line direction vector, the number of blinks per unit time, and the like.

The visual line range determination unit 103 determines whether the visual line range of the operator of the vehicle corresponds to a recognition range of either the operation panel range 6 or the external-environment checking range 7.

The vigilance calculation unit 104 calculates at least one of the alertness and attentiveness of the operator on the basis of movement of the operator's visual line.

The control unit 101 performs control of the on-board device 3 of the vehicle on the basis of the recognition range of the operator and at least one of the alertness and attentiveness.

Figure 5:
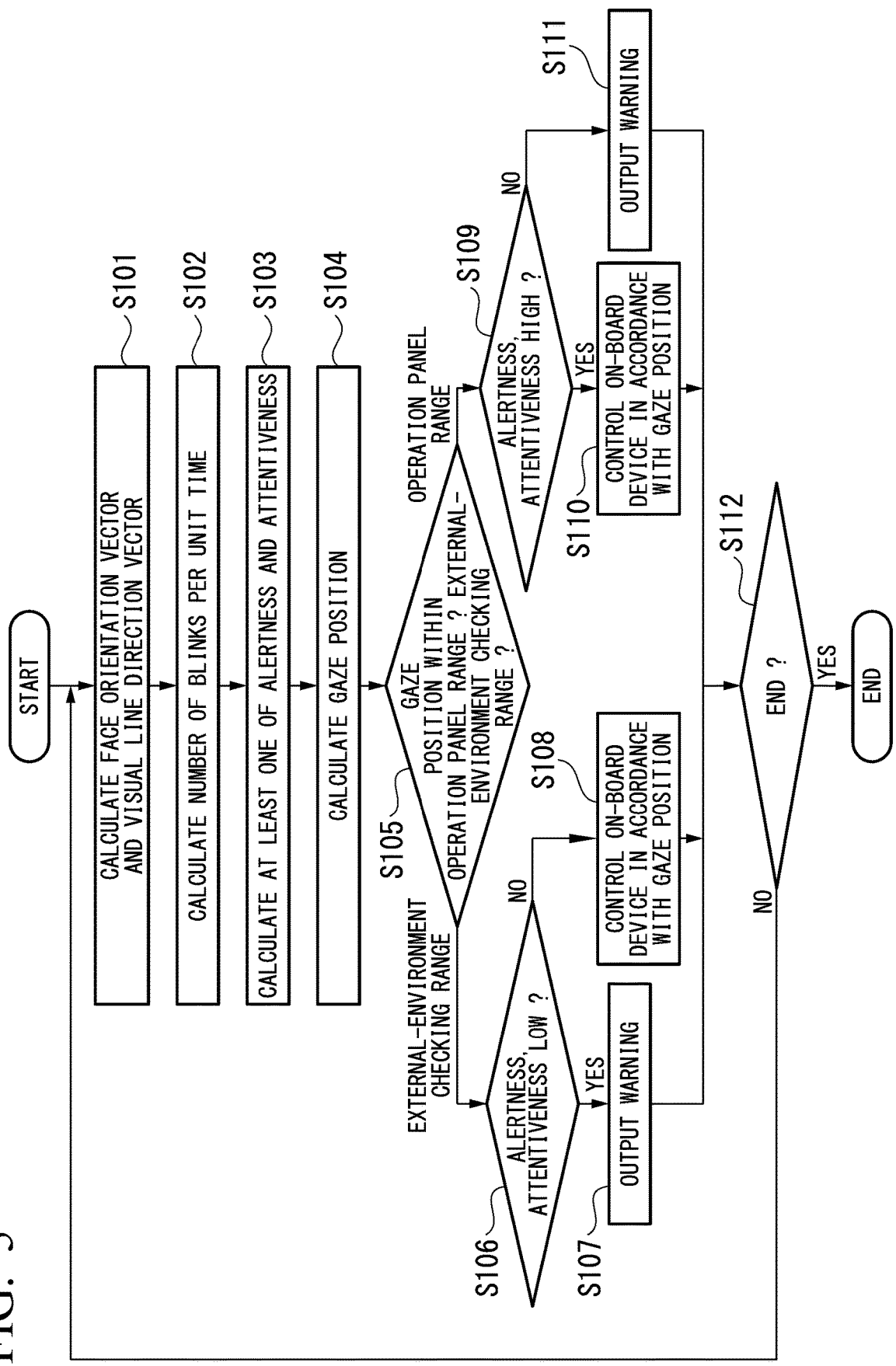
FIG. 5 is a drawing showing the process flow of the vehicle operation assistance device.

FIG. 5 is a diagram showing the processing flow of the vehicle operation assistance device.

First, the monitoring device 2 captures images of the operator's face with the camera 21. The monitoring device 2 then outputs image data obtained by capturing images of the operator's face to the vehicle operation assistance device 1 at short intervals such as several shots or several tens of shots per second. The monitoring device 2 may also output image data of each still image constituting a moving image to the vehicle operation assistance device 1.

The feature calculation unit 102 of the vehicle operation assistance device 1 uses the operator's facial features and eye features that appear in an image shown by the input image data to calculate the face orientation vector and the visual line direction vector of the operator (Step S101). A publicly known technique may be used to calculate the face orientation and visual line direction. The feature calculation unit 102 detects features such as the nose, eyes, and ears of the face, for example, and calculates the horizontal and vertical angles of the face on the basis of the positional relationships of the features in the image. In addition, the feature calculation unit 102 detects an eye region and, on the basis of the positions of the eye balls in the eye region, calculates the visual line direction vector based on the face orientation vector. The feature calculation unit 102 may also calculate each of the face orientation vector and the visual line vector based on a reference direction vector in a virtual space area in the vehicle. The reference direction vector is, for example, a vector that coincides with a forward direction vector when the operator is looking straight ahead.

The feature calculation unit 102 also calculates the number of blinks per unit time (Step S102). The feature calculation unit 102 may analyze a change in the user's eye area in the image data so as to calculate whether or not a blink has occurred based on a change in the size of the surface area. In order to detect blinks, the camera 21 has the ability to capture several tens of shots of image data per second. The feature calculation unit 102 outputs the face orientation vector and the visual line direction vector to the visual line range determination unit 103 and the vigilance calculation unit 104. The feature calculation unit 102 also outputs the number of blinks per unit time to the vigilance calculation unit 104.

The vigilance calculation unit 104 calculates at least one of the operator's alertness and attentiveness using at least one of facial feature information and the face orientation vector, the visual line direction vector, and the number of blinks per unit time. (Step S103). The vigilance calculation unit 104 calculates the operator's alertness and attentiveness based on movement of the operator such as movement of the visual line.

For example, the vigilance calculation unit 104 determines that the attentiveness level is low when a state in which the degree of difference between the face orientation vector and the visual line direction vector is greater than or equal to a predetermined angle appears at least a predetermined number of times per unit time. The vigilance calculation unit 104 determines that the alertness is low when a state in which the visual line direction vector has not changed for a predetermined time or more appears a predetermined number of times per unit time. The vigilance calculation unit 104 also determines that the alertness is low when the number of blinks per unit time is equal to or greater than a predetermined number. In addition, the vigilance calculation unit 104 may determine whether the alertness or the attentiveness is high or low on the basis of the number of blinks per unit time.

The vigilance calculation unit 104 inputs the feature information, the face orientation vector, the visual line direction vector, and the number of blinks per unit time and the like into an alertness calculation formula or an attentiveness calculation formula. Then, the vigilance calculation unit 104 may compare the value calculated by the calculation formula with threshold values to determine whether the alertness and attentiveness are high, low, or normal on the basis of whether the calculated value is equal to or greater than or less than an upper threshold value and a lower threshold value. For example, the threshold values of alertness and attentiveness are respectively provided. Note that the threshold values of alertness and the threshold values of the attentiveness may be the same threshold values. The vigilance calculation unit 104 outputs information indicating whether the alertness is high, low or normal, or whether the attentiveness is high, low, or normal to the control unit 101.

The visual line range determination unit 103 calculates the gaze position in a plane region obtained by converting the virtual space coordinates in the vehicle into plane coordinates using the face orientation vector and the visual line direction vector (Step S104). The visual line range determination unit 103 determines whether the gaze position is in a recognition range of either the operation panel range 6 or the external-environment checking range 7 (Step S105). That is, the visual line range determination unit 103 determines whether the recognition range including the visual line range of the operator of the vehicle is within the operation panel range 6 or the external-environment checking range 7. When the gaze position is within the operation panel range 6, the visual line range determination unit 103 determines whether the gaze position is included in any sub-area, namely, the indicator area 61 or the audio operation area 62, included in the operation panel range 6.

When the gaze position is within the external-environment checking range 7, the visual line range determination unit 103 determines whether the gaze position is included in any sub-area, namely, a first area 71, a second area 72, or a third area 73, included in the external-environment checking range 7.

The visual line range determination unit 103 outputs to the control unit 101 information indicating whether the gaze position is included in the operation panel range 6 or the external-environment checking range 7 and identification information indicating the sub-area within each range in which the gaze position is included.

When the gaze position is within the external-environment checking range 7, the control unit 101 determines whether at least one of the alertness and attentiveness is lower than the threshold value (Step S106). When at least one of the alertness or attentiveness is lower than the threshold value (YES in Step S106), the control unit 101 outputs warning information to the on-board device 3 (Step S107). The on-board device 3 in this case is, for example, an audio device or a monitor. The warning information may be emitted by voice from the audio device, or the warning information may be displayed on a monitor.

As described above, when at least one of the alertness and attentiveness is lower than the threshold value, the control unit 101 instructs any one on-board device 3 corresponding to the recognition range among the plurality of on-board devices 3 to output warning information. In this way, the instruction to output the warning information is issued on the basis of a combination of the alertness or attentiveness and the recognition range of the operator. Thereby, more appropriate operation assistance can be provided.

On the other hand, when the alertness and attentiveness are higher than the threshold value (NO in Step S106), the control unit 101 controls the on-board device 3 according to the gaze position (Step S108). When the alertness and attentiveness are higher than the threshold value, the control unit 101 may also not particularly need to control the on-board device 3 regardless of the gaze position.

The following example is given as an example of controlling the on-board device 3. When the gaze position corresponds to the first area 71 provided in the external-environment checking range 7, the control unit 101 may instruct a speed limiting device that is one of the on-board devices 3 to cancel the vehicle speed limiting value. When the first area 71 includes the gaze position based on the visual line direction vector, the visual line direction and the straight line direction of the vehicle substantially coincide. When the operator's alertness and attentiveness are high in such a situation, the operator is highly likely to take an early avoidance maneuver in the event of there being a danger in the straight line direction. Therefore, the control unit 101 can instruct the speed limiter that is the on-board apparatus 3 to cancel or increase the speed limit value.

As an example of controlling the on-board device 3 when the gaze position is within the external-environment checking range 7, the following example is given. When the operator's gaze position corresponds to the window on the left side of the vehicle, the control unit 101 may output an instruction signal for blinking the left-direction direction indicator to the indicator control device.

Thus, when the recognition range including the operator's visual line direction corresponds to the external-environment checking range 7, the control unit 101 performs control on any one on-board device 3 in accordance with the operator's gaze position within the external-environment checking range 7 among the plurality of on-board devices 3.

On the other hand, when the gaze position is within the operation panel range 6, the control unit 101 determines whether the alertness and attentiveness are higher than the threshold value (Step S109). For example, the control unit 101 determines whether the alertness and attentiveness are higher than the threshold value. When the alertness and attentiveness are high (YES in Step S109), the control unit 101 controls the on-board device 3 in accordance with the gaze position (Step S110). When the alertness and attentiveness are higher than the threshold value, the control unit 101 may also not particularly need to control the on-board device 3 regardless of the gaze position.

Thus, when the recognition range including the operator's visual line direction corresponds to the operation panel range 6, the control unit 101 performs control on any one on-board device 3 in accordance with the operator's gaze position within the operation panel range 6 among the plurality of on-board devices 3.

On the other hand, when the alertness and attentiveness are low (NO in Step S109), the control unit 101 outputs warning information to the on-board device 3 (Step S111). For example, the control unit 101 outputs warning information to the on-board device 3 when at least one of the alertness and attentiveness is lower than the threshold value. The on-board device 3 in this case is, for example, an audio device or a monitor. The warning information may be emitted by voice from the audio device, or the warning information may be displayed on the monitor.

The following example is given as an example of controlling the on-board device 3 in Step S110. When the gaze position corresponds to the indicator area 61 provided in the operation panel range 6, the control unit 101 further specifies an instrument that matches the gaze position of the operator among the operation elements in the indicator area 61. Here, it is assumed that a monitor is provided in the operation panel, and each instrument such as the speed, engine speed, and engine temperature in the indicator is displayed as an image. The on-board device 3 detects the instrument that matches the gaze position of the operator, and outputs to the monitor a signal instructing enlargement of the display area of that instrument. The gaze position of the operator is included in the signal output by the on-board device 3 to the monitor. The monitor specifies the instrument corresponding to the gaze position, and displays an enlarged image of the range of that instrument.

In this way, when the recognition range is the operation panel range 6, the control unit 101 outputs an instruction signal to the on-board device 3 operated by any one of a plurality of operation elements provided on the operation panel, the instruction signal including information indicating the target operation element corresponding to the gaze position of the operator and information indicating a request to enlarge the display of the target operation element. According to such a process, even when the operator is elderly with poor vision, display of the instrument being gazed at is enlarged, which can contribute to the assistance of the operator's driving.

When the gaze position corresponds to the audio operation area 62 provided in the operation panel range 6, the control unit 101 may similarly specify the operation element corresponding to the gaze position within the audio operation area 62 and automatically perform control of that operation element.

In this way, when the recognition range is the operation panel range 6, the control unit 101 outputs an operation instruction corresponding to the gaze position of the operator to the on-board device 3 operated by any one of the plurality of operation elements provided in the operation panel. Thereby, it is possible to more highly assist operation of a mobile body by an operator.

In addition, when the recognition range is the operation panel range 6 and the alertness and attentiveness are higher than a threshold value, the control unit 101 outputs an operation instruction in accordance with the gaze position of the operator to the on-board device 3 operated by any of a plurality of operation elements provided in the operation panel. In this way, the control unit 101 outputs an operation instruction on the basis of a combination of the alertness or attentiveness and the operator's gaze position. Thereby, it is possible to avoid mis-operations and provide a high level of assistance for operation.

The control unit 101 may detect a blink by the operator, and may determine that a wink is performed when the blink is only on one side of the eyes. In this case, the control unit 101 controls the operation element that is being gazed at in the audio operation area 62 based on the winking.

The control unit 101 determines whether to end the process (Step S112). If the process does not end (NO in Step S112), the control unit 101 performs control to repeat the process from Step S101.

According to the above processing, the vehicle operation assistance device 1 controls the on-board device 3 of a mobile body on the basis of at least one of the calculated alertness or attentiveness, and the recognition range in which the operator's visual line range is included. The vehicle operation assistance device 1 can perform control of an on-board device for assisting the operator on the basis of the range of the gaze position based on the operator's face orientation and visual line orientation, and the alertness or attentiveness. Thereby, it is possible to further assist an operator performing operation of a mobile body such as a vehicle.

Figure 6:
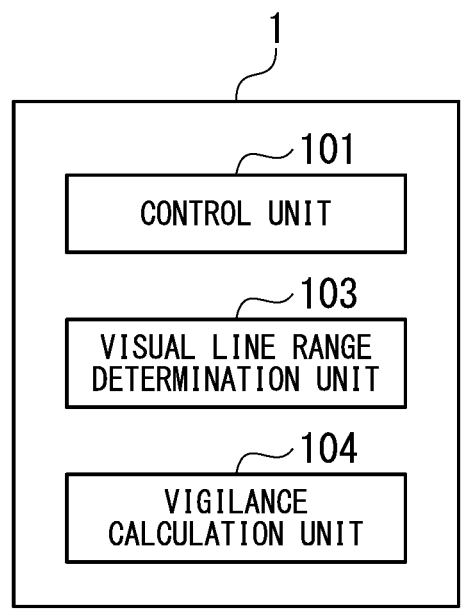
FIG. 6 is a drawing showing the minimum constitution of the vehicle operation assistance device.

FIG. 6 is a diagram illustrating a minimum configuration of the vehicle operation assistance device.

The vehicle operation assistance device 1 may be provided with at least the functions of the control unit 101, the visual line range determination unit 103, and the vigilance calculation unit 104.

The visual line range determination unit 103 determines whether the visual line range of the operator of the mobile body corresponds to the recognition range of the operation panel range to be operated or the external-environment checking range.

The vigilance calculation unit 104 calculates the operator's alertness and attentiveness on the basis of at least movement of the operator's visual line.

The control unit 101 performs control on an on-board device of the mobile body on the basis of at least one of the alertness and attentiveness, and the recognition range.

Although the case where the mobile body is a vehicle has been described in the above processing, the mobile body is not limited to a vehicle, and may be an aircraft, a ship, or the like.

Each device described above has a computer system therein. A program for causing each device to perform the processes described above is stored in a computer-readable recording medium of the device, and the above processing is performed by the computer of the device reading and executing this program. Here, the computer-readable recording medium means a magnetic disk, a magneto-optical disk, a CD-ROM, a DVD-ROM, a semiconductor memory, or the like. Further, the computer program may be distributed to a computer through communication lines, and the computer that has received this distribution may execute the program.

The program may realize some of the functions described above. Further, the program may be a so-called differential file (differential program) that can realize the above-described functions in combination with a program already recorded in the computer system.

INDUSTRIAL APPLICABILITY

According to the present invention, it is possible to more highly assist operation of a mobile body by an operator.

REFERENCE SIGNS LIST

1: Vehicle operation assistance device
2: Monitoring device

3: On-board device
4: Database
101: Control unit
102: Feature calculation unit
103: Visual line range determination unit
104: Vigilance calculation unit

The invention claimed is:

1. A vehicle operation assistance device comprising:
at least one memory configured to store instructions; and
at least one processor configured to execute the instructions to:
determine whether a recognition range including a visual line range of an operator of a mobile body corresponds to either an operation panel range to be operated or an external-environment checking range;
calculate attentiveness of the operator based on whether or not a state in which a difference between a visual line direction vector and a face orientation vector of the operator is greater than or equal to a predetermined angle appears at least a predetermined number of times per unit time; and
control on-board devices of the mobile body based on the recognition range, when the attentiveness is higher than a threshold value.

2. The vehicle operation assistance device according to claim 1, wherein
the at least one processor is configured to execute the instructions to control, when the recognition range corresponds to the external-environment checking range, any one of the on-board devices in accordance with a gaze position in the external-environment checking range.

3. The vehicle operation assistance device according to claim 1, wherein
the at least one processor is configured to execute the instructions to control, when the recognition range corresponds to the operation panel range, any one of the on-board devices in accordance with a gaze position in the operation panel range.

4. The vehicle operation assistance device according to claim 1, wherein
the at least one processor is configured to execute the instructions to perform, when the attentiveness is lower than the threshold value, an output instruction of warning information to any one of the on-board devices in accordance with the recognition range.

5. The vehicle operation assistance device according to claim 1, wherein the at least one processor is configured to execute the instructions to:
calculate alertness of the operator based on whether or not a state in which the visual line direction vector of the operator remains unchanged for at least a predetermined time appears the predetermined number of times per unit time; and
control the on-board devices of the mobile body based on the recognition range when the alertness is higher than the threshold value.

6. The vehicle operation assistance device according to claim 1, wherein the at least one processor is configured to execute the instructions to:
calculate alertness of the operator based on whether or not a number of blinks of the operator appears at least the predetermined number of times per unit time; and
control the on-board devices of the mobile body based on the recognition range when the alertness is higher than the threshold value.

7. The vehicle operation assistance device according to claim 1, wherein the at least one processor is configured to execute the instructions to:
input the visual line direction vector of the operator, the face orientation vector of the operator, and a number of blinks of the operator per unit time, into an alertness calculation formula and an attentiveness calculation formula, and calculate alertness and the attentiveness of the operator; and
control the on-board devices of the mobile body based on the recognition range when the alertness and the attentiveness are higher than respective threshold values.

8. A vehicle operation assistance method comprising:
determining whether a recognition range including a visual line range of an operator of a mobile body corresponds to either an operation panel range to be operated or an external-environment checking range;
calculating attentiveness of the operator based on whether or not a state in which a difference between a visual line direction vector and a face orientation vector of the operator is greater than or equal to a predetermined angle appears at least a predetermined number of times per unit time; and
controlling on-board devices of the mobile body based on the recognition range, when the attentiveness is higher than a threshold value.

9. A non-transitory computer-readable recording medium storing a program that causes a computer of a vehicle operation assistance device to execute processing of:
determining whether a recognition range including a visual line range of an operator of a mobile body corresponds to either an operation panel range to be operated or an external-environment checking range;
calculating attentiveness of the operator based on whether or not a state in which a difference between a visual line direction vector and a face orientation vector of the operator is greater than or equal to a predetermined angle appears at least a predetermined number of times per unit time; and
controlling on-board devices of the mobile body based on the recognition range, when the attentiveness is higher than a threshold value.

* * * * *